No. 638,102. Patented Nov. 28, 1899.
E. F. EDGECOMB.
PHOTOGRAPHIC CAMERA.
(Application filed Nov. 8, 1897.)
(No Model.) 3 Sheets—Sheet 1.
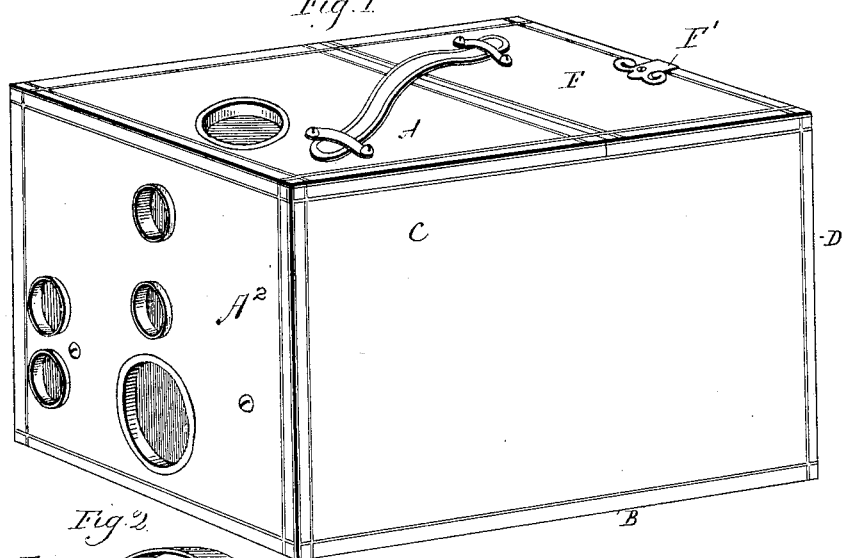
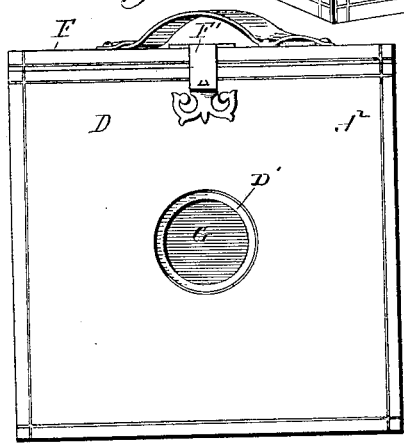
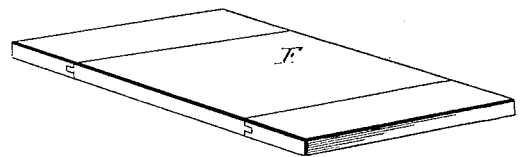
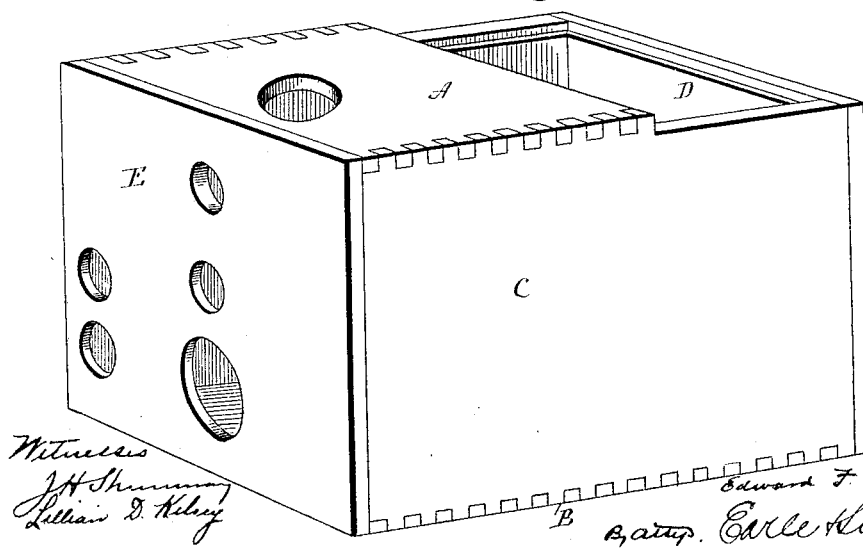

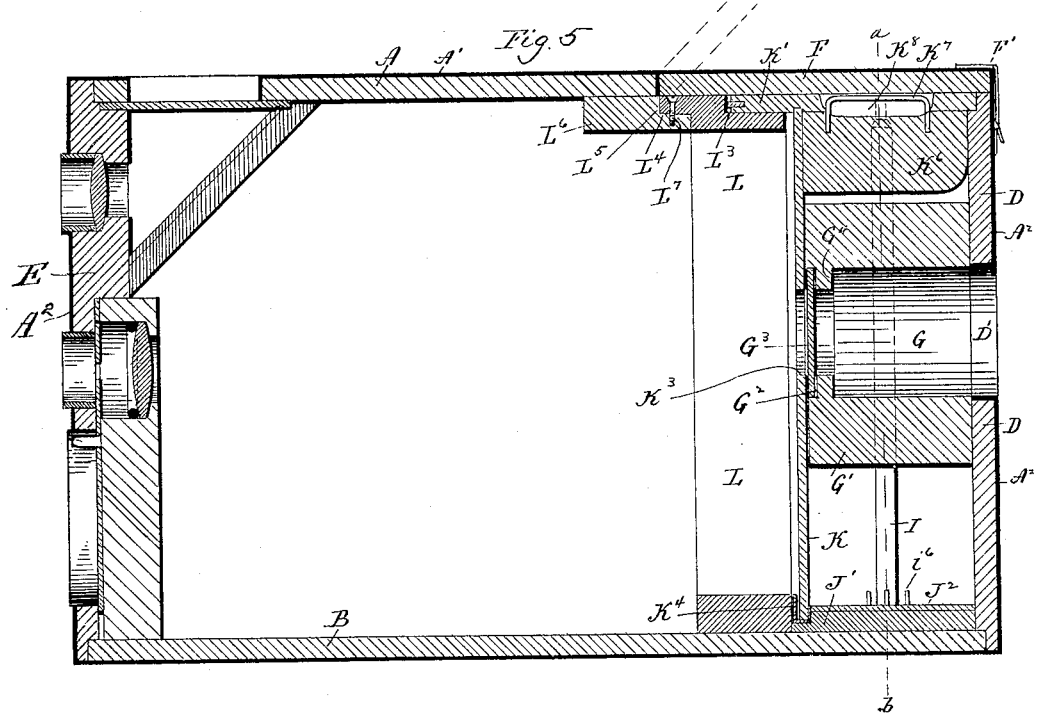

No. 638,102.  
E. F. EDGECOMB.  
PHOTOGRAPHIC CAMERA.  
(Application filed Nov. 8, 1897.)  
Patented Nov. 28, 1899.
(No Model.) 3 Sheets—Sheet 3.
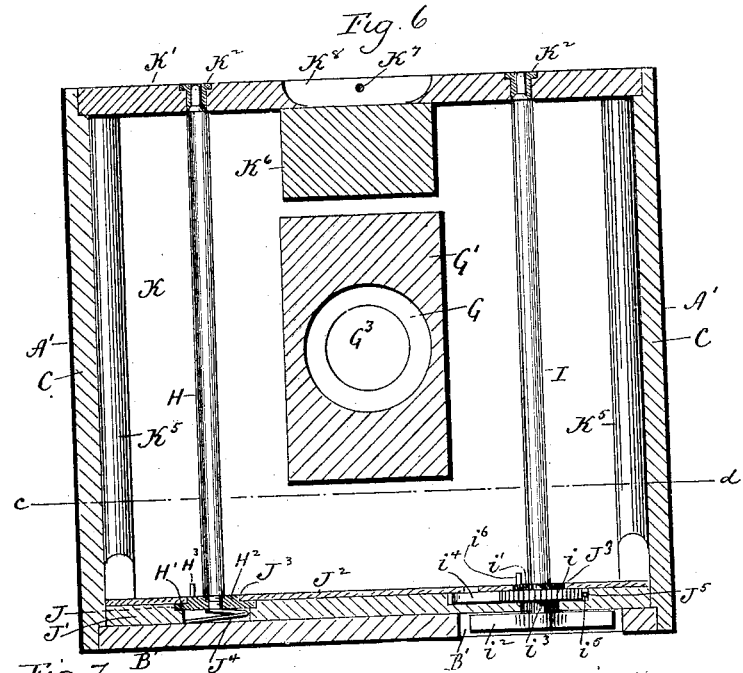
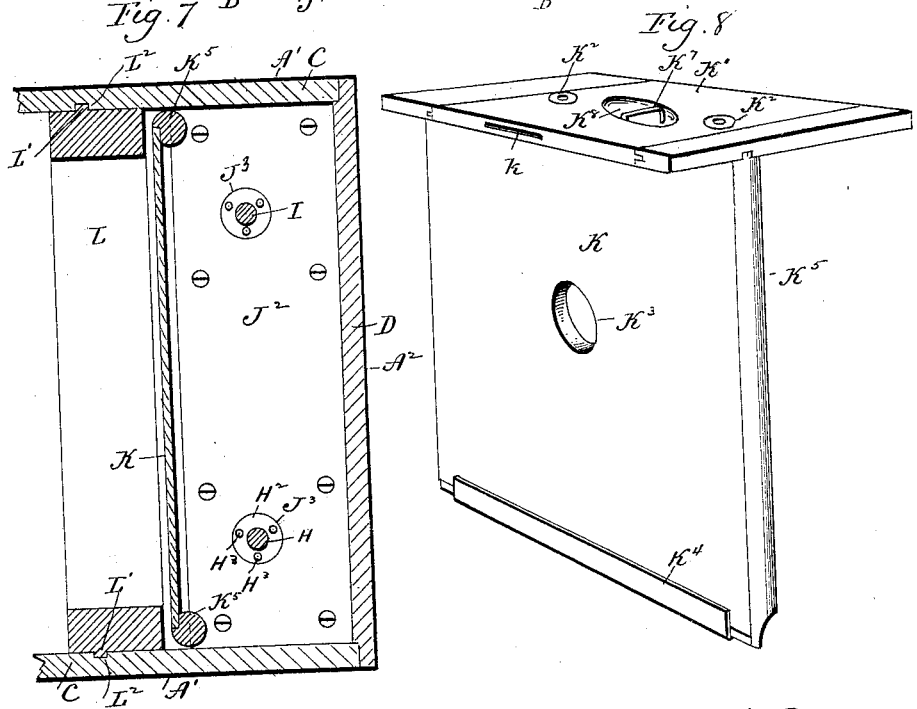

UNITED STATES PATENT OFFICE.

EDWARD F. EDGECOMB, OF NEW HAVEN, CONNECTICUT, ASSIGNOR, BY MESNE ASSIGNMENTS, TO THE E. & H. T. ANTHONY & COMPANY, OF NEW YORK, N. Y.

PHOTOGRAPHIC CAMERA.

SPECIFICATION forming part of Letters Patent No. 638,102, dated November 28, 1899.

Application filed November 8, 1897. Serial No. 657,753. (No model.)

*To all whom it may concern:*

Be it known that I, EDWARD F. EDGECOMB, of New Haven, in the county of New Haven and State of Connecticut, have invented a new Improvement in Portable Cameras; and I do hereby declare the following, when taken in connection with the accompanying drawings and the letters of reference marked thereon, to be a full, clear, and exact description of the same, and which said drawings constitute part of this specification, and represent, in—

Figure 1, a perspective view of a camera constructed in accordance with my invention; Fig. 2, a view thereof in rear elevation; Fig. 3, a perspective view of the camera-box stripped of its covering and with its door removed; Fig. 4, a detached perspective view of the door with the covering thereof removed; Fig. 5, a view of the camera in vertical longitudinal central section; Fig. 6, a view of the camera in vertical transverse section on the line $a\,b$ of Fig. 5; Fig. 7, a broken view of the camera in horizontal section on the line $c\,d$ of Fig. 6; Fig. 8, a detached perspective view of the platen and its combined lifting and light-excluding plate.

My invention relates to an improvement in that class of portable cameras employing rolled sensitized films, the object being to produce a camera the box of which is completed and covered preparatory to the introduction of its equipment into it, to provide for the convenient introduction and removal of the film and platen and for the effective exclusion of light from the box when it is closed, and to furnish means for holding the film in place against the front of the platen.

A further object of my invention is to produce a camera in which the number of movable parts is reduced to the minimum consistent with a high character of effective work.

With these ends in view my invention consists in a camera having certain details of construction and combinations of parts, as will be hereinafter described, and pointed out in the claims.

In carrying out my invention as herein shown I employ a box consisting of a top A, a bottom B, sides C C, rear end D, and forward end E. The said members are permanently united together by dovetailing or in any other approved manner.

The door F of the box is composed, as shown, of three permanently-united sections and is attached to the rear end of the top A of the box, to the interior of which it gives access. The said door is furnished with a fastening device F', which may be of any approved construction. Preferably in the manufacture of the box its several members will be permanently connected together, so as to form an integral structure. The door will then be put in place and a wide band A' of any suitable covering material, such as leather or cloth, wrapped around the top, sides, and bottom of the box. The edges of the said band are then folded over the front and rear ends of the box, to which rectangular end pieces $A^2 A^2$ are then applied and secured. The box being now covered, the door is freed by the insertion of a sharp instrument under it, so as to detach it from the sides and rear end of the box, but not from the top thereof, to which it remains attached, as by a flap which is formed by a portion of the band A'. The method above described constitutes a simple and effective method of making a camera-box. I am permitted to use such a box by the particular character of the instrumentalities which are introduced into it, as will be hereinafter described. Such a box is obviously cheaper and more effective than a sectional-box, which is not completely assembled until some of the instrumentalities introduced into it are in place.

A circular sight-opening D', formed in the rear end of the box, opens into a horizontal cylindrical sight-passage G, formed in what I shall call a "housing" G', attached directly to the inner face of the rear end of the box at a point above the bottom thereof, the extreme inner end of the said housing being recessed, as at $G^2$, in line with the passage G for the reception of a circular sight-window $G^3$, formed of red celluloid, glass, or other equivalent material and resting upon an annular flange $G^4$, formed at the inner end of the passage G. Two spool-holding spindles H and I are located in the rear end of the box and on opposite sides of the said housing G', which is virtually interposed directly between them. The spindle H, I shall hereinafter refer to as the "stock-spindle," as the unspent roll is mounted upon it, while the spindle I, I shall hereinafter refer to as the "winding-spindle," as it is employed to wind up the sensitized film as fast as the same has been exposed. The lower end of the stock-spindle has secured to it a disk H', formed with a hub $H^2$ smaller than it is in diameter, the disk and hub being centrally perforated and threaded for the reception of the threaded stem forming the lower end of the spindle H, whereby the said disk and hub are permanently connected with the said end of the spindle. The said disk is set into a recess J, formed to receive it in a step J', consisting of a strip of wood located upon the rear end of the bottom B of the box and firmly secured in place.

A metal plate $J^2$ is secured to the upper face of the step and formed with a circular opening $J^3$ just large enough to receive the hub $H^2$, which bears in it, the said plate bearing upon the upper face of the disk H' and holding the spindle in place. A friction-spring $J^4$, located in a recess formed in the step below the recess J and smaller in diameter than the same, engages with the lower face of the disk H' and imposes sufficient restraint upon the spindle H to prevent the same from turning except as required. The hub $H^2$ has one or more pins $H^3$ set into it for being engaged by the rolled film, so as to cause the same to rotate with the spindle, which is rotated by the draft upon it caused by turning the winding-spindle. The winding-spindle I is furnished at its lower end with a pinion $i$, having a hub $i'$ smaller than it is in diameter, the said pinion and hub being formed integral and rigidly secured to the shouldered lower end of the spindle I by means of a winding-handle $i^2$, having a hub $i^3$, which bears against the lower face of the pinion $i$, the said handle having a threaded opening, by which it is adapted to be applied to the extreme lower end of the spindle, which is threaded. The plate $J^2$ is also formed with a circular opening $J^3$, which receives the hub $i'$, to which it conforms in diameter, the said plate bearing upon the upper face of the said pinion $i$, and thus holding the spindle in place. The said pinion $i$ is set into a recess $J^5$, formed in the step J' and large enough not only to receive the pinion, but also a pawl $i^4$ and a spring $i^5$ for operating the same, whereby the winding-spindle is prevented from rotating except in the required direction. Pins $i^6$, set into the hub $i$, are provided for the connection of the film with the winding-spindle. The bottom of the box is recessed, as at B', for the reception of the winding-handle $i^2$.

With regard to the means just described for securing the stock-spindle in place and for securing the winding-spindle in place and preventing it from rotation, except in one direction, I may say that these means may be varied as desired and constitute no part of my present invention.

The removable platen K is provided at its upper end with a fixed plate K', which may with propriety be termed a "combined lifting and light-excluding plate," as it is employed not only to lift the platen, but also to exclude light from the box, which it does by being adapted to fill the opening in the rear end of the top of the box, the said opening being also closed by the door F. The said plate projects rearwardly beyond the rear face of the platen, its rearwardly-projecting portion being furnished with metallic bushing-like bearings $K^2 K^2$, which receive the upper ends of the spindles H and I. The said platen K is formed with a central opening $K^3$, registering with the sight-opening D, sight-passage G, and sight-window $H^3$. The extreme lower end of the said platen is provided with a horizontal sheet-metal film-confining lip-like guard $H^4$, within which the lower edge of the film is confined, whereby the film is held against the forward face of the platen and prevented from bowing forward and so from being bruised or defaced. Each edge of the platen is provided with a cross-sectionally round film-bearing strip $K^5$ $K^5$, these strips being longitudinally rabbeted for their application to the ends of the platen to which they are applied, so as to be flush with its forward face and so as to project rearward from its rear face. They constitute the surfaces over which the film is drawn on its way from the stock-spindle H to the winding-spindle I. The rearwardly-projecting portion of the said plate is supported by a block $K^6$, which is located centrally between the bearings $K^2 K^2$ and which provides for the attachment of a wire lifting-handle $K^7$, located in a finger-recess $K^8$, formed in the said portion of the said plate and also extending downward into the upper face of the said block for a short distance. The forwardly-projecting portion of the plate rests upon the upper edge of the removable diaphragm-frame L, forming a broken joint, by means of which light is excluded from the box. A small strip $k$, of brass wire or equivalent material, is set into the forward edge of the plate K' for engagement with the diaphragm-frame, so as to insure the pushing of the plate rearward to form a light-excluding joint between its rear edge and the rear end of the box, as shown in Fig. 5. It will be clear that by opening the door F the platen K and the horizontal plate K', attached to its upper end, may be readily inserted into and removed from the box, together with the film, which is prevented from bowing forward, so as to leave the front face of the platen, by means of the lip-like guard $K^4$, within which the lower edge of the film is set, and which thus prevents the film from being fouled with the diaphragm-frame when the platen and film are being introduced into or removed from the box. I may here add that in speaking of the film I refer not only to the sensitized film proper, but also to its long black paper protector, which extends beyond its ends and the function of which is well understood.

The diaphragm-frame L, which is located directly in front of the platen, has its side members formed with tongues L' L', which run in corresponding grooves L² L², Fig. 7, formed in the inner faces of the sides C C of the box, whereby the frame is held against displacement. The upper member of the frame is recessed, as at L³, for the reception of the forward portion of the horizontal plate K', as seen in Fig. 5, the said upper member of the frame being also formed with a forwardly-projecting flange L⁴, which fits into a rabbet L⁵, formed in the rear edge of a horizontal brace L⁶, located within the box at a point directly under the rear end of the top A and the hinged inner end of the cover F. It will be seen by reference to Fig. 5 that when the cover is thrown entirely open there is just clearance for the introduction and removal of the diaphragm-frame, which is normally secured in place by means of a screw L⁷, passing through the flange L⁴ into the rear edge of the brace L⁶.

Having fully described my invention, what I claim as new, and desire to secure by Letters Patent, is—

1. A camera-box having a sight-opening formed in its rear end, and a housing located within the rear portion of the box and carrying a sight-window.

2. A camera-box having its rear end formed with a sight-opening, a window-sight housing secured to the inner face of the said end of the box, and formed with a sight-passage, and a window-sight mounted in the said housing at the forward end of the passage therein.

3. A camera-box having its top, bottom, sides and ends permanently attached together and provided at the rear end of its top with a flap-like door, and having two spool-holding spindles secured by their lower ends within its rear end.

4. A camera-box having two spool-holding spindles located within its rear end, and a sight-window housing also located within the rear end of the said box and directly interposed between the two spindles.

5. A camera-box having its top, bottom, sides and ends permanently attached together, having two spool-holding spindles located within its rear end, and a sight-window housing secured to the rear end of the box above the bottom thereof, and projecting forward between the said spindles between which it is interposed.

6. A camera-box having its top, bottom, sides and ends permanently attached together, having two spool-holding spindles located within its rear end, a step located upon its bottom at the rear end thereof, into which the lower ends of the spindles are set, and a plate secured to the upper face of the said step for holding the spindles in place in the said step in which they are free to rotate.

7. The combination with a camera-box formed at the rear end of its top with an opening closed by a door, of spool-holding spindles secured by their lower ends within the rear end of the box, and a removable platen adapted to be introduced into and removed from the box through the said opening, and provided upon the lower portion of its front face with means for engaging with the lower edge of the film which is thus confined and kept from bowing forward into the forward portion of the box.

8. The combination with a camera-box formed at the rear end of its top with an opening closed by a door, of spool-holding spindles secured by their lower ends within the rear end of the box, and a removable platen adapted to be introduced into and removed from the box through the said opening, and provided at its upper end with a permanently-attached combined light-excluding and lifting plate, the rear portion of which is employed for supporting the upper ends of the spool-holding spindles.

9. The combination with a camera-box formed at the rear end of its top with an opening closed by a door, of spool-holding spindles secured by their lower ends within the rear end of the box, and a removable platen adapted to be introduced into and removed from the box through the said opening, and formed with an opening located at or near its center, and provided upon the lower portion of its front face with a lip-like guard, within which the lower edge of the film is received and confined, and prevented from bowing forward into the forward portion of the box.

10. The combination with a camera-box having the rear end of its top formed with an opening closed by a door, of a platen adapted to be introduced into and removed from the box through the said opening, and provided upon the lower portion of its front face with an independently-formed, sheet-metal, film-confining, lip-like guard, which receives the lower edge of the film and prevents the same from bowing forward into the forward portion of the box.

11. The combination with a camera-box having the rear end of its top formed with an opening closed by a door, of a platen adapted to be introduced into and removed from the box through the said opening, and provided upon its edges with independently-formed, permanently-applied, rounded or bead-like strips projecting rearwardly from its rear face, and forming smooth surfaces for the film to ride over.

12. The combination with a camera-box having the rear end of its top formed with an opening closed by a door, of a platen adapted to be introduced into and removed from the box through the said opening, said platen provided at its upper end with a permanently-attached, combined light-excluding and lifting plate projecting forward of its front face and rearward of its rear face, the rearwardly-projecting portion of said plate being adapted to support the upper ends of the said spool-holding spindles.

13. A removable camera-platen provided at its upper end with a permanently-attached combined lifting and light-excluding plate projecting forward and rearward, and spool-holding spindle-bearings located in the rearwardly-projecting portion of the said plate for receiving the upper ends of the spool-holding spindles which are secured by their lower ends within the box of the camera.

14. A removable camera-platen provided at its upper end with a permanently-attached combined lifting and light-excluding plate projecting forward and rearward and having a block secured to its rear face for supporting the rearwardly-projecting portion of the said plate which is recessed at a point over the said block to receive a lifting-handle.

15. A camera-box having the rear end of its top formed with an opening closed by a door, spool-holding spindles secured by their lower ends within the rear portion of said box, a removable platen adapted to be introduced into and removed from the box through the said opening and to support the upper ends of said spindles, and a removable diaphragm-frame adapted to be inserted into and removed from the box through the said opening and occupying a position directly in front of the said platen.

16. A camera having the top, bottom, sides and ends of its box permanently united, having its said top provided with a flap-like door, and having a removable diaphragm-frame adapted to be inserted into the box through the said door, the said diaphragm-frame being provided with tongues for holding it in place, and with a forwardly-projecting light-excluding rabbet.

17. A camera having two spool-holding spindles secured within the rear end of its box by their lower ends, a housing located between the said spindles and carrying a sight-window, and a removable platen adapted to be introduced into the rear portion of the box, and to have the film passed around its edges and over its front face, and provided with a film-confining lip-like guard located at the lower end of its front face to receive the lower edge of the film, and furnished at its upper end with a permanently-attached combined lifting and light-excluding plate.

18. A camera having two spool-holding spindles secured by their lower ends within the rear end of its box, a removable platen adapted to be introduced into the rear end of the said box, and furnished at its upper end with a permanently-attached lifting and light-excluding plate projecting forwardly and rearwardly from it, and a rectangular diaphragm-frame adapted to be introduced into the box at a point directly in front of the platen and cut away at its upper end to receive the forwardly-projecting portion of the said plate.

19. A camera having a box, the top, bottom, sides and ends of which are permanently secured together, and the top of which is provided with a flap-like door, a removable diaphragm-frame adapted to be inserted into the box through the door thereof, a removable platen also adapted to be introduced into the box through the said door at a point immediately in rear of the said frame, two spindles located within the rear end of the case to which they are secured by their lower ends, and a sight-window housing applied to the rear end of the box and projecting forward between the said spindles.

In testimony whereof I have signed this specification in the presence of two subscribing witnesses.

EDWARD F. EDGECOMB.

Witnesses:
FREDERIC C. EARLE,
LILLIAN D. KELSEY.